US005294052A

United States Patent [19]

Kukesh

[11] Patent Number: 5,294,052

[45] Date of Patent: Mar. 15, 1994

[54] FLUID DISPENSING SYSTEM

[75] Inventor: Timothy S. Kukesh, Indianapolis, Ind.

[73] Assignee: Glas-Craft, Inc., Indianapolis, Ind.

[21] Appl. No.: 940,649

[22] Filed: Sep. 4, 1992

Related U.S. Application Data

[63] Continuation-in-part of Ser. No. 601,828, Nov. 7, 1990, Pat. No. 5,178,326, which is a continuation-in-part of Ser. No. 342,185, Apr. 24, 1989, Pat. No. 4,967,956, which is a continuation-in-part of Ser. No. 80,475, Jul. 31, 1987, Pat. No. 4,824,017, which is a continuation-in-part of Ser. No. 885,006, Jul. 14, 1986, abandoned.

[51] Int. Cl.[5] .......................... F16K 11/02; B05B 7/04

[52] U.S. Cl. .................................... 239/112; 239/127; 239/414; 239/416.1; 239/427; 137/625.41

[58] Field of Search ...................... 239/8, 11, 290, 296, 239/299, 418, 422, 154, 112, 414, 416.1, 427, 127; 137/625.41, 625.47

[56] References Cited

U.S. PATENT DOCUMENTS

| | | | |
|---|---|---|---|
| D. 252,097 | 6/1979 | Probst et al. | D23/17 |
| 944,598 | 12/1909 | Caskey | 137/625.41 |
| 2,780,496 | 2/1957 | Asbeck et al. | 299/140.1 |
| 2,864,653 | 12/1958 | Liedberg et al. | 299/140 |
| 3,079,090 | 2/1963 | Decker | 239/414 |
| 3,202,363 | 8/1965 | Kautz et al. | 239/413 |
| 3,521,824 | 7/1970 | Wilcox | 239/424.5 |
| 3,635,400 | 1/1972 | Nord et al. | 239/15 |
| 3,675,895 | 7/1972 | Matousek | 251/315 |
| 3,735,956 | 5/1973 | Matousek | 251/315 |
| 3,799,403 | 3/1974 | Probst et al. | 222/135 |
| 3,843,052 | 10/1974 | Cowan | 239/3 |
| 3,873,023 | 3/1975 | Moss et al. | 239/112 X |
| 3,893,621 | 7/1975 | Johnson | 239/9 |
| 4,026,516 | 5/1977 | Matousek | 251/214 |
| 4,033,481 | 7/1977 | Hicks et al. | 239/414 X |
| 4,083,493 | 4/1978 | Wiggins | 239/112 |
| 4,123,007 | 10/1978 | Gardner | 239/414 |
| 4,187,882 | 2/1980 | Watson | 239/127 X |
| 4,281,683 | 8/1981 | Hetherington et al. | 137/606 |
| 4,325,513 | 4/1982 | Smith et al. | 239/112 |
| 4,386,739 | 6/1983 | Kwok | 239/296 |
| 4,407,454 | 10/1983 | Massey | 239/154 |
| 4,534,802 | 8/1985 | Gates et al. | 239/112 X |
| 4,549,676 | 10/1985 | Gerich | 222/145 |
| 4,618,098 | 10/1986 | Hedger, Jr. et al. | 239/290 |
| 4,685,488 | 8/1987 | Corbin et al. | 137/328 |
| 4,713,257 | 12/1987 | Luttermoller | 427/27 |
| 4,723,710 | 2/1988 | Lucore, II | 239/127 X |
| 4,745,011 | 5/1986 | Fukuta et al. | 427/426 |
| 4,760,956 | 8/1986 | Mansfield | 239/8 |
| 4,767,057 | 8/1988 | Degli et al. | 239/296 |
| 4,824,017 | 4/1989 | Mansfield | 239/9 |

FOREIGN PATENT DOCUMENTS

| | | | |
|---|---|---|---|
| 2842384 | 4/1980 | Fed. Rep. of Germany | 137/625.41 |
| 57-90762 | 6/1982 | Japan . | |
| 735983 | 8/1955 | United Kingdom | 69/3 |

OTHER PUBLICATIONS

Venus Products, Inc. 4th Edition Catalog, 1987, the cover page and pp. 1 and 78.

*Primary Examiner*—Andres Kashnikow
*Assistant Examiner*—William Grant
*Attorney, Agent, or Firm*—Willian Brinks Hofer Gilson & Lione

[57] ABSTRACT

Fluid dispensing systems include a novel fluid dispensing system with air motor driven pumps which provide a substantially, constant preselected dispensation of fluids without deleterious transient variations in the fluid output as the dispensing system is operated on and off, a novel valve particularly adapted for use in multi-component dispensing systems to provide selective controlled flow of fluid component materials or of a cleansing solvent in the system, and a novel dispenser for multi-component dispensing systems incorporating the novel valve and, in some embodiments, the novel valve combined with a preferred spraying means.

22 Claims, 8 Drawing Sheets

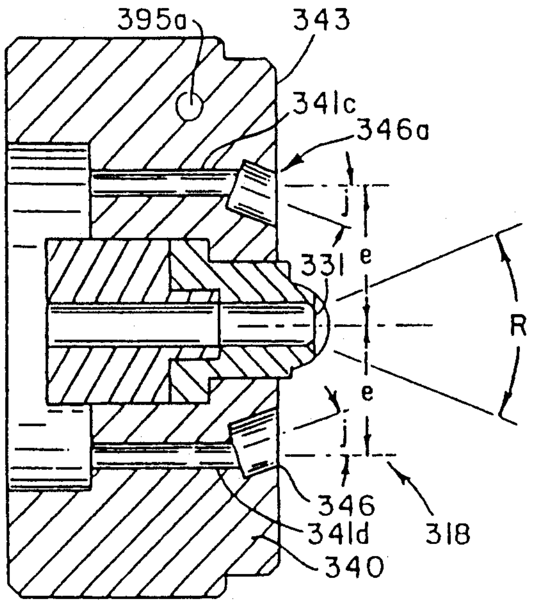
FIG. 8A
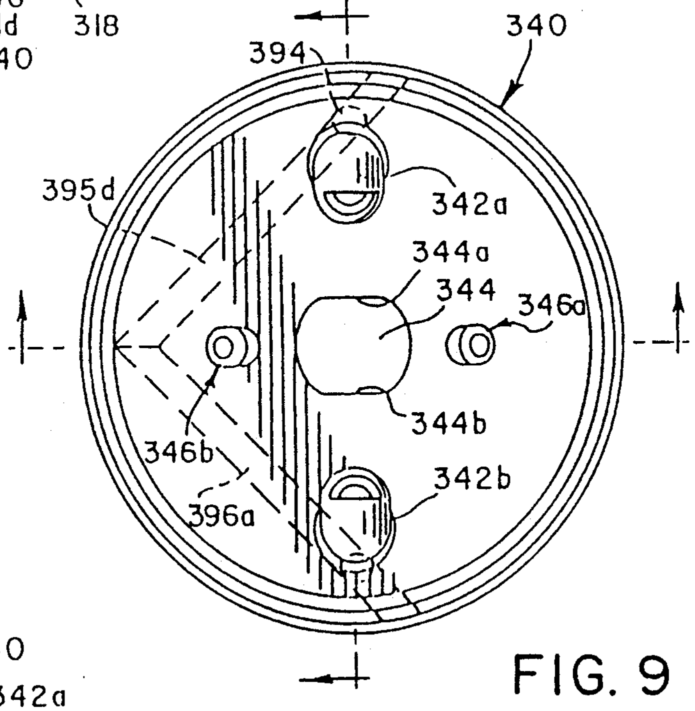
FIG. 9
FIG. 8B
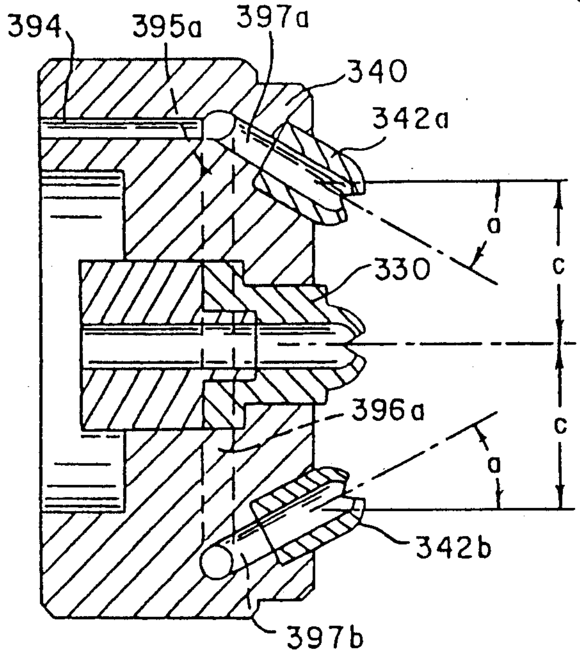

FLUID DISPENSING SYSTEM

This is a continuation-in-part of U.S. patent application Ser. No. 07/601,828 filed Nov. 7, 1990, now U.S. Pat. No. 5,178,326, which is a continuation-in-part of International patent application Ser. No. PCT/US90/01691 filed Mar. 30, 1990, which is a continuation-in-part of U.S. patent application Ser. No. 07/342,185 filed Apr. 24, 1989, now U.S. Pat. No. 4,967,956, which was a continuation-in-part of U.S. patent application Ser. No. 07/080,475 filed Jul. 31, 1987, now U.S. Pat. No. 4,824,017, which was a continuation of U.S. patent application Ser. No. 06/885,006 filed Jul. 14, 1986, now abandoned.

BACKGROUND ART

This invention relates generally to fluid dispensing systems, including multi-component fluid spraying and pouring systems, and, more particularly, to the fluid supply apparatus, plural component valves and dispensers and sprayers of such systems.

Multi-component fluid dispensing systems are used in many manufacturing applications. For example, multi-component spraying systems have been used in manufacturing plastic articles by applying resinous materials to a mold or a preform for the article. In such systems, a liquid resin and a catalyst for the resin are formed into spray particles directed to a substrate where the catalyst and resin react and harden to form the articles. In such applications, two components, for example a resin and a catalyst, are preferably mixed together and the mixture is sprayed onto the substrate.

Multi-component fluid dispensing systems have also been used, for example, in the manufacture of insulating foams. In such systems, a first component and a second component, for example, a polyol resin and an isocyanate, are mixed and after mixing dispensed or sprayed into or onto an article of manufacture where the mixed components react to produce a hardened insulating foam.

More recently, multi-component painting systems have been developed that apply plural fluid components that react, when mixed, to form hardened, decorative and protective coatings, and other applications for multi-component dispensing systems are continuing to arise with the development of new plural component materials.

Multi-component dispensing systems for mixed plural component materials are divided generally into two categories, those in which the multiple components are mixed externally to the system apparatus (referred to as external mix systems) and those in which the multiple components are mixed within the system apparatus (referred to as internal mix systems). In both external mix and internal mix systems, it is important that the components be supplied for mixing at the precise ratios recommended by the plural component material manufacturers for curing the mixed plural component material. The effective use of plural component material requires fluid dispensing systems that may be adjusted to vary widely the ratios between the fluid components of the plural component material; for example, multi-component fluid dispensing systems must be capable of mixing and dispensing materials with ratios from 1:1 to as high as about 16:1. If, in operation, a fluid dispensing system varies the precise ratio or generates pressure imbalances within the system, it may dispense fluid materials that result in partially cured or uncured portions as a result of departure from the required mixing ratios and unsatisfactory mixing.

Such variations in the operation of a fluid dispensing system can be particularly harmful in internal mix systems where the components are mixed within the fluid dispensing device. It is common in such internal mix dispensing systems that the fluid dispenser include an internal mixing chamber into which the plural components to be mixed are injected by the multi-component fluid delivery system, as shown, for example, in spraying dispensers of U.S. Pat. Nos. 3,240,432; 3,366,337; 3,379,376; 3,790,030; 3,799,403; and 4,123,007. Various agencies are used to clean the internal mixing chamber in internal mix dispensers. For pour type dispensers, the internal mix chamber is frequently purged of mixed plural component material by a rod which is thrust through the mixing chamber, or by solvent which is forced to flow through the mixing chamber. In spray-type dispensers, the internal mixing chamber is frequently purged of mixed plural component material by either a flow of compressed air or solvent or occasionally both.

Multi-component dispensers frequently also include diametrically opposed orifices for the injection of the plural components into the mixing chamber to assist in mixing as shown, for example, in U.S. Pat. Nos. 3,366,337; 3,790,030; and 3,799,403. In such systems, particularly those with diametrically opposed injection orifices, transient pressure and flow imbalances can not only result in the dispensing of off-ratio material which may not properly cure, but the injection of one component into the dispenser passageways of the other component where it can mix with the other component out of reach of the cleansing agent and cure to form a blockage in the dispenser or a flow restriction that with throw the system off-ratio.

The fluid dispenser of the multi-component dispensing system is generally supplied with the plural components by a multi-component fluid delivery system which maintains the components separate and apart from each other until they are mixed. The multi-component fluid delivery systems include first and second supply tanks for storing supplies of the components to be mixed. Frequently, a transfer pump is connected to the output of each tank to transfer components to proportioning pumps which, in turn, are provided to deliver each component to the dispenser of the system at the precise desired rate.

Compressed air is generally available in manufacturing facilities for the operation of various power-driven hand tools that are frequently used in manufacturing operations. It is convenient and desirable that the fluid dispensing system be adapted to operate from such compressed air, which is frequently referred to as "factory air". Thus, fluid delivery systems frequently include a control which is connected with the factory air, and flows of compressed air are directed and controlled by the fluid dispensing system control to operate and control the valves and pumps of the fluid dispensing system.

In most systems, the proportioning pumps generally comprise positive displacement pumps, most frequently reciprocating piston pumps, which are driven from a single air motor by a common interconnecting mechanism in a proportioning pump assembly. The proportioning pump assembly permits each of the positive displacement pumps to be mounted between an assembly base and the common mechanism in a variety of positions that provide variations in the ratio of the components as each of the component pumps is operated by the air motor through the common interconnecting mechanism. By varying the mechanical interconnection of each component pump between the base and the common interconnecting mechanism that drives the pump, with each stroke of the air pump, each reciprocating piston of each proportioning pump can be driven through a different stroke length and deliver a different flow volume of each component.

The fluid dispensing system control can include a motor air control valve that is connected between the source of factory air and the air motor of the fluid dispensing system and is operable to control the flow of air to the air motor and thereby the operation of the positive displacement component pumps of the fluid delivery system. The fluid dispensing system control can also include, for example, a leak relay which controls the application of air pressure from the factory air source to the motor air control valve for operation of the motor air control valve and the air motor. Such a leak relay can be connected to the factory air source and through a flexible fluid hose with a small air valve on the dispenser so that by operation of the air valve by the system operator through actuation of a trigger, button, lever or other such mechanical actuator, a flow of air is established from the factory air source through the leak relay, which will operate the motor air control valve and thereby operate the air motor and component pumps. The trigger, button, lever or mechanical actuator of the dispenser can also simultaneously operate a fluid valve or valves controlling the flow of the plural components through the dispenser for application by the system operator. Fluid dispensing systems frequently include an air driven actuator on the dispenser for operation of the component flow control valves carried by the dispenser.

In existing systems, the fluid dispenser control, once the system is placed in operation, operates the motor air control valve to apply air pressure to the air motor at all times and controls the dispensing of fluid material by fluid flow control valves carried by the dispenser and operated by the system operator. In such existing systems, when the system operator wants to dispense material, he opens the fluid flow control valves carried by the dispenser to permit each of the plural components to flow into and through the dispenser. In internal mix systems, the fluid flow control valves of each of the components are upstream of the internal mixer. When these valves are closed, to stop the dispensing of fluid material, the fluid pressure within the conduits leading from the fluid component pumps to the fluid valves increases as a result of the increased static pressure applied to the air motor of the fluid dispensing system, which is greater than the operating air pressure of the air motor, which is reduced as a result of the various pressure drops due to air flow restrictions in dispensing system control and, to some extent, the factory air distribution system.

When the system operator thereafter opens the fluid component flow control valves of the dispenser, the higher fluid pressure resulting from the increased static air pressure applied to the air motor, results in momentarily increased fluid pressure and flow rates of the plural component materials into and through the fluid dispenser which results in transient flow rates in excess of the desired flow rate and the dispensation of mixed plural component materials which are off-ratio. In addition, the transient pressure and flow increases, particularly where the components of the system were mixed with high ratios, one to the other, for example, in the range of 8:1 to 15:1, interfere with proper mixing of the components and, because of the wide pressure imbalance, can frequently force one-component material into passageways of the other component material within the dispenser which cannot be purged by the cleansing agent.

In some systems, the fluid delivery systems include heat exchangers and heated hoses to heat and maintain the temperature of the components of a plural component material prior to delivery of the dispenser. In addition, some fluid delivery systems include components permitting the recirculation of the plural component materials, whether heated or unheated, between the dispenser and their sources. An example of such systems is disclosed in U.S. Pat. No. 4,809,909.

SUMMARY OF THE INVENTION

The invention includes a method and apparatus for providing effective and efficient dispensing, at substantially constant and preselected rates, of fluid materials such as the components of plural component materials.

Systems of the invention for dispensing plural fluid materials at a substantially constant rate include a first source of a first component of the plural component material and a second source of a second component of the plural component material, a first positive displacement pump for the first component and a second positive displacement pump for the second component, an air motor, including a driven output and an input connected with a source of compressed air, a driving mechanism connected between the air motor output and the first and second positive displacement pumps, and a dispenser connected with the first and second positive displacement pumps and including a flow control actuator and a dispensing output. In the invention, a control for the air motor comprises a motor air control valve connected between the air motor input and the source of compressed air, and the motor air control valve is actuated by the flow control actuator to assume, in a dispense mode, a first position to open the air motor input to the source of compressed air thereby driving the air motor and the first and second positive displacement pumps and dispensing mixed first and second components at a preselected rate, and to assume, in a non-dispense mode, a second position to close the air motor input to the source of compressed air and to maintain the operating air pressure on the air motor.

Where systems of the invention include a mixer in the fluid dispenser and a source of solvent for the mixed plural component material to cleanse the dispenser, the fluid dispenser further includes connection adapted to receive a flow of solvent and conduits to direct the flow of solvent through the fluid dispenser, mixer and output for removal of mixed plural component material.

Preferred internal mix systems of the invention include a fluid dispenser valve supported, preferably carried by the dispenser, operable by the system operator to interconnect, as desired, the connections for plural component material, or the connection for the solvent, to the dispenser output. In such preferred systems of the invention, the valve can be operated to place it in a first position in which the flow of solvent is blocked and flows of the first and second components of the plural component material are permitted to flow through the connections to be combined in the valve and directed in a combined flow from the valve to the dispenser output, or the valve can be placed in the second position in which the flows of plural components are blocked and a flow of solvent is permitted through its connection and the valve and is directed by the valve through any downstream mixer and the dispenser output. The invention thus includes, whether incorporated into a dispenser body or as a separate element, a novel valve comprising a valve body and a movable valve member that is carried within a cavity of the valve body and is movable between the first and second positions as described above.

In a preferred such valve, the valve body has a first passageway leading from a first connection for fluid material to a first internal opening at the cavity of the valve body. A second passageway of the valve body leads from a second connection for fluid material to a second internal opening at the cavity of the valve body. A third passageway of the valve body leads from a third connection to a third opening at the cavity of the valve body, and a fourth passageway leads from a fourth connection to a fourth opening of the cavity at the valve body. The movable valve member is provided with a first valve passageway leading from the surface of the movable valve body to an internal passageway junction; a second valve passageway leading from the surface of the movable valve body to the internal passageway junction; and a third valve passageway leading from the surface of the movable valve body to the internal passageway junction. The passageways of the valve body and the movable valve member are so located at the surface forming the cavity of the valve body and the surface of the movable valve member that at the first position of the movable valve member, the first valve passageway is aligned with the first passageway of the valve body, the second valve passageway is aligned with the second passageway of the valve body and the third valve passageway is aligned with the third passageway of the valve body, thereby permitting fluid flow through the first and second passageways of the valve body and valve member to combine at the internal passageway junction of the movable valve member and to flow through the third passageways of the valve member and valve body to the third, or output, connection. In the second position of the movable valve member, either one of the first or second valve passageways of the valve member may be aligned with the fourth passageway of the valve body, the other of the first and second valve passageways being blocked by the cavity wall of the valve body, and the third passageway of the valve body is aligned with the third valve passageway, thereby permitting fluid to flow through the fourth passageway of the valve body and one of the first and second valve passageways to the internal passageway junction and to flow through the third passageways of the valve member and valve body. Such a valve of this invention is preferably a ball valve that is rotatable between the first and second positions about the central axis of the third valve passageway. With such a preferred ball valve, the first and second valve passageways of the ball valve member share the same central passageway axis and form a "T" with the third valve passageway at the internal passageway junction of the ball valve member.

Such a valve body is particularly adapted to be carried by a dispenser body with the third, or output, connection of the valve in communication with the dispenser output, including any internal mixer within the dispenser. On such a dispenser, a small actuator can be connected to the movable valve member where it can be easily operated by a workman who selects dispensing operations in the first position in which plural component materials connected to the valve flow through and are combined in the valve and are directed to the dispenser output, or cleaning operations in the second position in which the flow of plural component material is blocked and cleansing solvent connected to the valve body flows through the valve and any internal mixer to the dispenser output. The valve is preferably adapted to be carried at the rear of the dispenser body and further adapted so that the connections for the plural component materials and solvent provide closely spaced hose connections that extend in a convenient direction.

In a preferred spraying dispenser of the invention, a flow of compressed air is directed at the planar surfaces of an expanding film of mixed plural component material from the opposite sides thereof to impinge upon the expanding film a fraction of an inch forwardly of the fluid output orifice and a pair of compressed air flows is directed forwardly and generally parallel to each other and to the spray axis to impinge upon the expanding sides of the film forwardly of the impingement of the compressed air on the expanding liquid film. Surprisingly, when compressed air is directed at the expanding edges of the fan-shaped plural component film downstream of the impingement of the compressed air upon the expanding liquid film, the uncontrolled billowing flow of air and escaping particles is eliminated. In addition, spray pattern size is reduced; and an improvement in spray pattern uniformity results without the creation of escaping atomized plural component particles that have characterized prior air-assist, airless atomizing systems. The coaction of the flows of compressed air results in the capture of the plural component particles within the spray pattern.

Such a preferred spraying dispenser permits more complete and effective atomization of the mixed plural component materials at liquid pressures and air volumes substantially lower than those commonly used in the prior art. Systems incorporated into the present invention, for example, may effectively operate with liquid pressures as slow as 300-500 psi.

Further advantages and specific details of the invention will be set forth hereafter in conjunction with the drawings and detailed description of the best modes of the invention.

BRIEF DESCRIPTION OF THE DRAWINGS

FIGS. 8A and 8B are two orthogonal views of the atomizing means of FIG. 7; and FIG. 9 is a front view of the atomizing means of FIGS. 7, 8A and 8B.

DESCRIPTION OF THE BEST MODE OF THE INVENTION

The invention of this application includes various novel embodiments, including a novel fluid dispensing system which provides a substantially, constant preselected dispensation of fluids without deleterious transient variations in the fluid output as the dispensing system is operated on and off, a novel valve particularly adapted for use in multi-component dispensing systems to provide controlled flow of fluid component materials and of a cleansing solvent in the system, and a novel dispenser for multi-component dispensing systems incorporating the novel valve and, in some embodiments, the novel valve combined with a preferred spraying means. These novel inventions may be combined in a best mode of the invention as described below or may be advantageous in other combinations to provide other novel multi-component dispensing systems.

Figure 1:
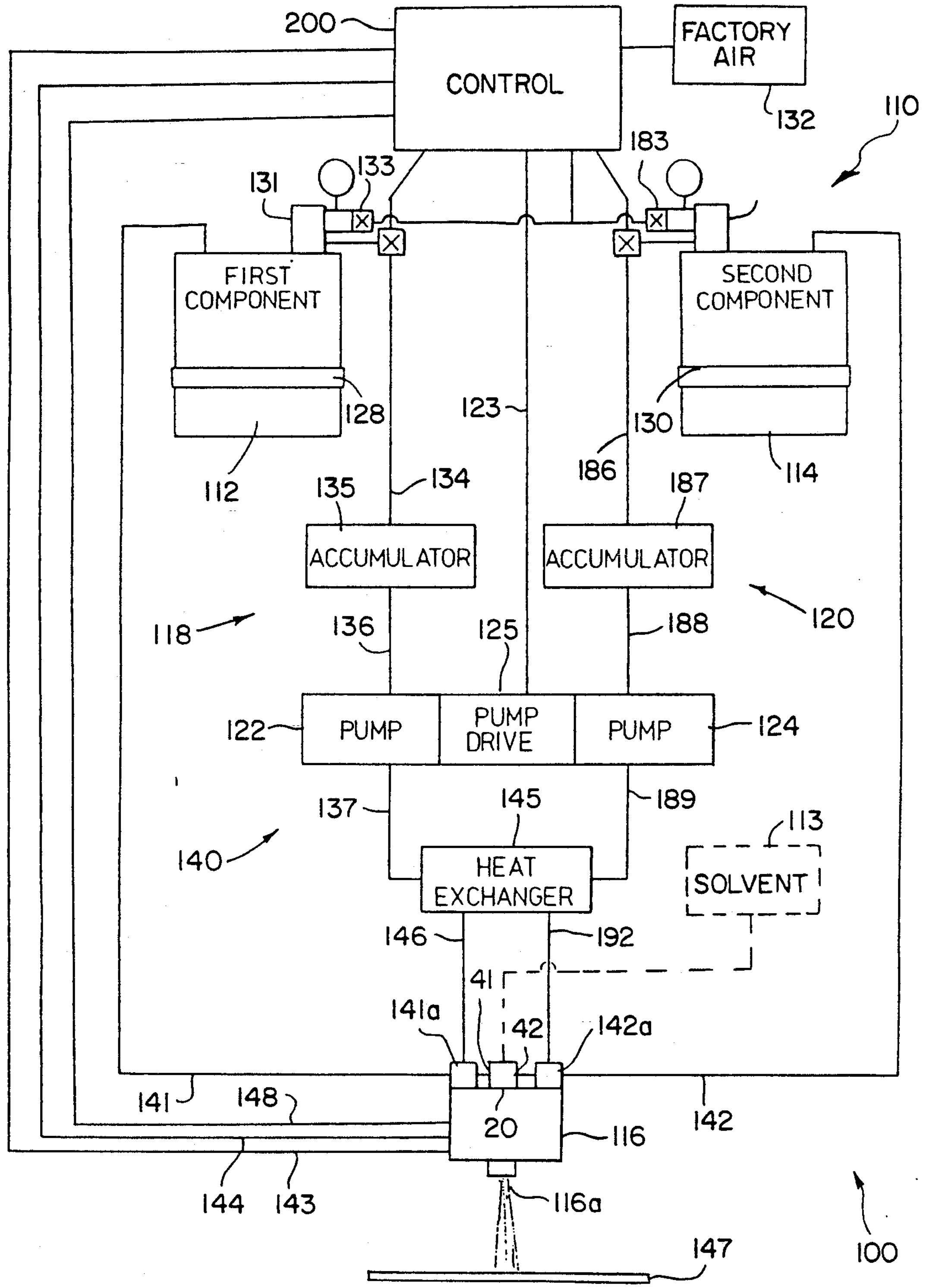
FIG. 1 is a schematic block diagram of one embodiment of a multi-component dispenser system of the invention.
Figure 2:
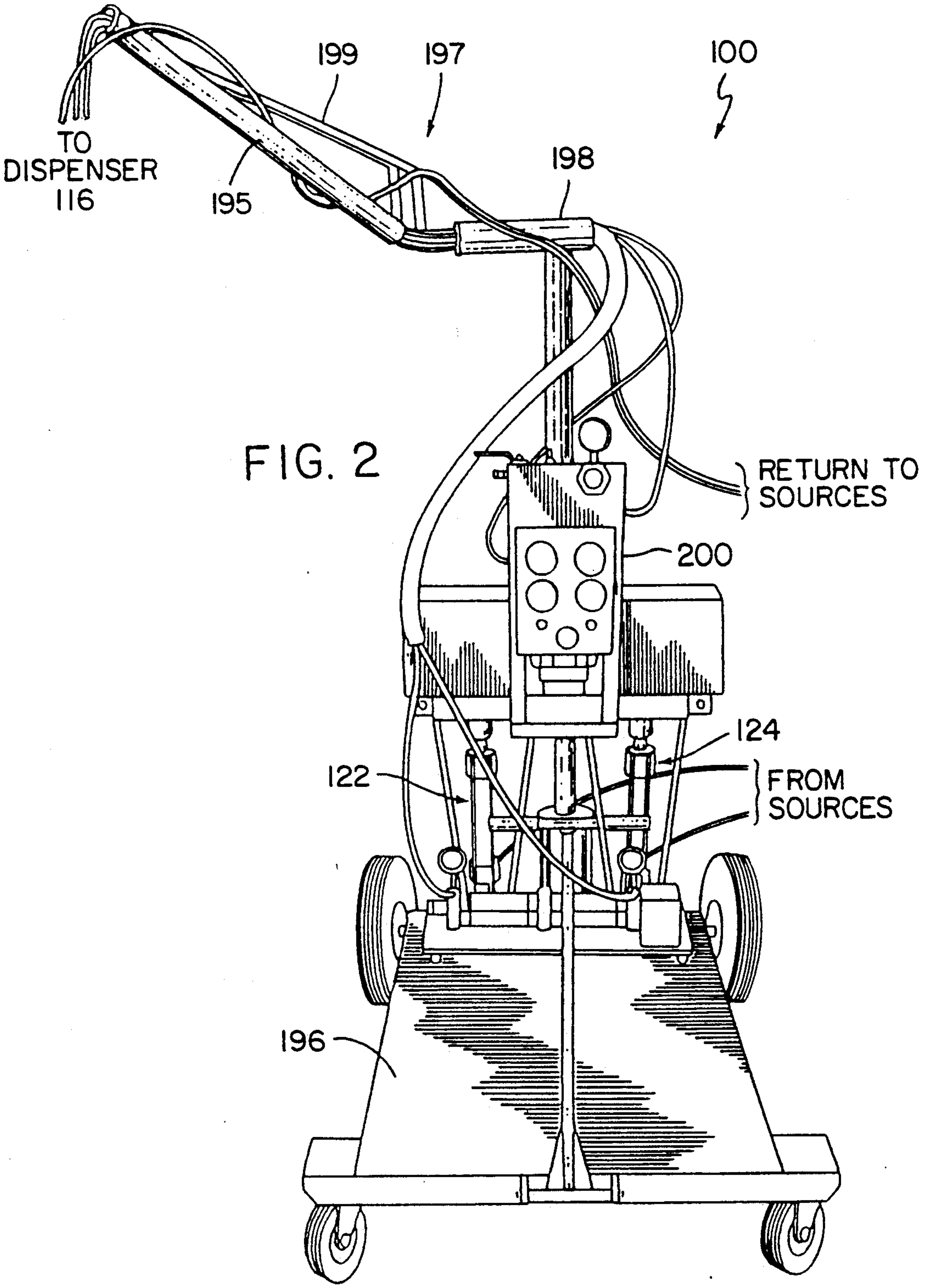
FIG. 2 is a perspective view of one embodiment of the multi-component dispensing system of FIG. 1.
Figure 3:
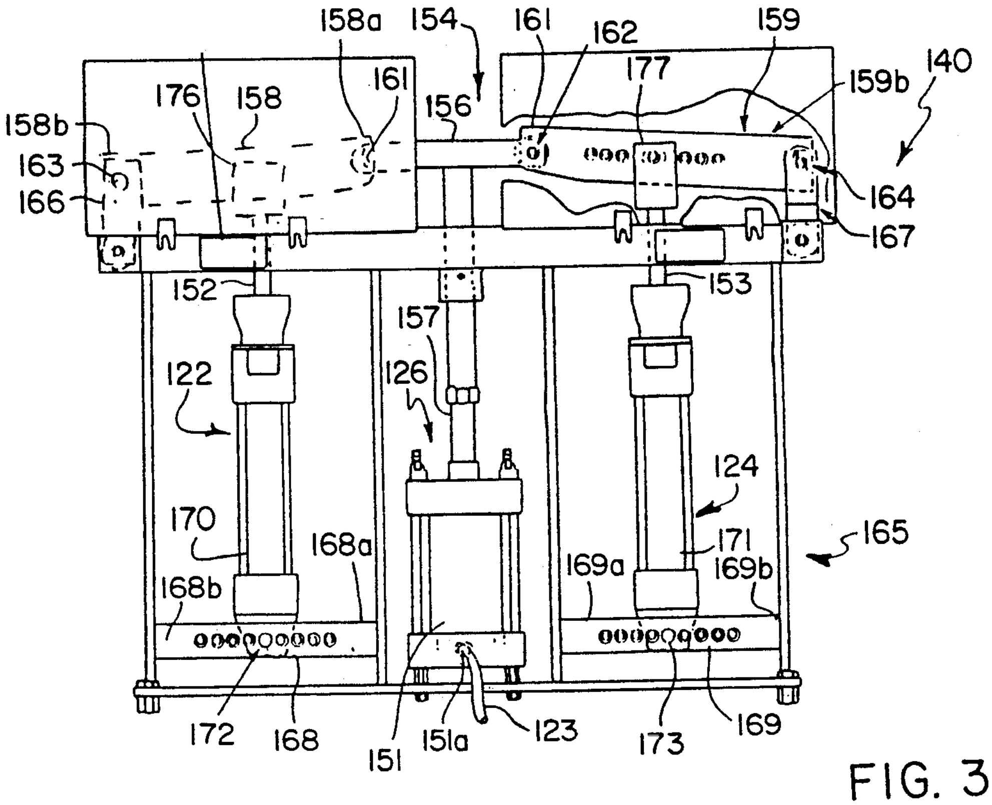
FIG. 3 illustrates an embodiment of the component pumping system of the fluid delivery system of the multi-component dispensing system of FIGS. 1 and 2.
Figure 4:
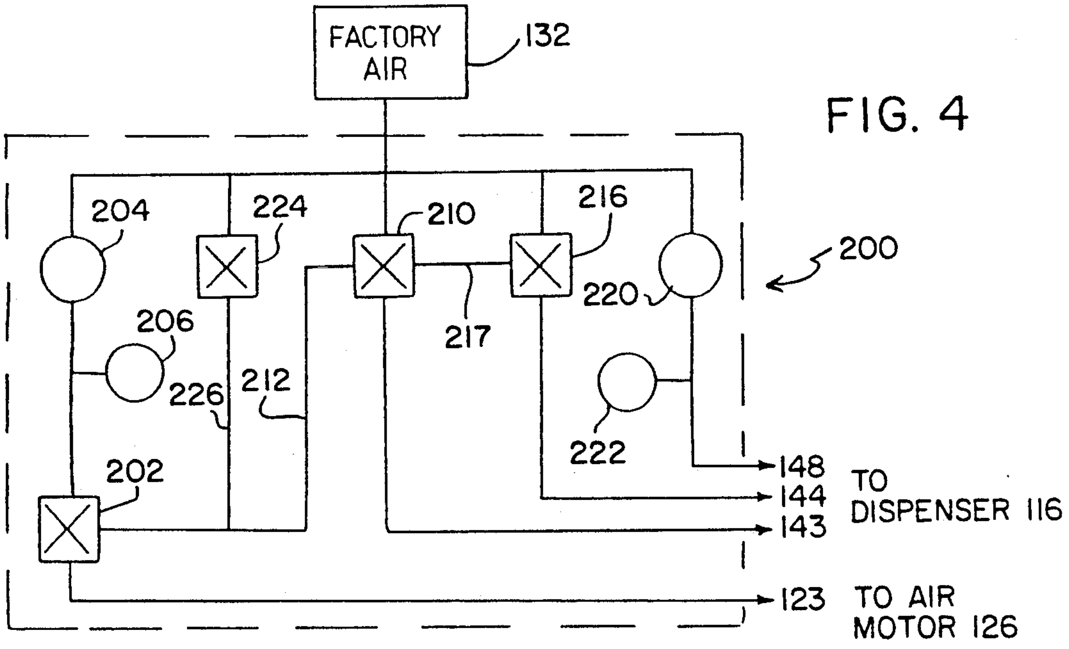
FIG. 4 is a schematic block diagram of one embodiment of a control for the fluid delivery system of the multi-component dispensing system of FIGS. 1 and 2.

FIGS. 1–4 illustrate one multi-component fluid dispensing system of the invention, with FIG. 1 illustrating the system in schematic block diagram form, FIG. 2 illustrating a perspective view of a system apparatus, FIG. 3 illustrating the variable ratio component pumping apparatus, and FIG. 4 illustrating, in a schematic block diagram, a control for the system. While the fluid dispensing system of FIG. 1 includes means for recirculating and heating the plural fluid components of the system, it must be understood that such components are not required in fluid dispensing systems of the invention.

The system 100 includes a first component source 112 of a first fluid component, e.g., liquid isocyanate, and a second fluid component, e.g., liquid polyol resin. The system also includes a mixing and dispensing device, or dispenser, 116 within which the two components are brought together and mixed and from which the mixture is dispensed.

A fluid delivery system 110 connects the component sources 112 and 114 to the mixing and dispensing device 116 and includes first and second component delivery systems 118 and 120, respectively, which include component pumps 122 and 124 for the first and second components, respectively, driven by common pump drive means 125 for delivering the components from the sources 112, 114 to the mixing and dispensing device 116 in ratios that can be changed by adjustment of the common pump drive means 125. Pumps 122 and 124 and pump drive means 125 are generally designated by reference numeral 140 and are shown in greater detail in FIG. 3. As described below, pump drive means 125 includes an air-driven motor 126 operated by compressed air through conduit 123 leading from the system control 200.

If desired, each component source can include a heating means 128 and 130, respectively, for lowering the viscosity of the components to desired temperatures within the sources. Component sources 112 and 114 can frequently comprise the standard 55-gallon drums within which the components are normally shipped and stored.

In the multi-component fluid delivery system illustrated in FIG. 1, the first component delivery system 118 includes a transfer pump 131 connected at the output of first source 112 to transfer the first component from first source 112 to pumping system 140. Transfer pump 131 comprises an air-driven, reciprocating, piston pump connected to a source of factory air 132 through a system control 200. A delivery air control valve 133 may be provided to control the operation of the pump 131.

The output of pump 131 is connected to the input of the first component delivery pump 122 via conduit 134, accumulator tank 135, and conduit 136. Accumulator 135 ensures that a supply of liquid is present at the input to delivery pump 122. The output of the first component pump 122 is connected by conduit 137 to a first portion of heat exchanger 145 which heats the first component to a desired temperature to be mixed with the second component in dispenser 116. The first component output of heat exchanger 145 is connected via conduit 146 to mixing and dispensing device 116. A return conduit 141 returns the first component from the mixing and dispensing device 116 back to source 112 to provide a closed loop delivery system for recirculating the first component from source 112 between the dispenser 116 and the source 112. A "switching" ball valve 141*a*, which may be carried by dispenser 116, directs the first component either into return conduit 141 or to dispenser 116.

Similarly, second component delivery system 120 includes transfer pump 181 connected to the output of second source 114 for pumping the second component to pumping system 140. Transfer pump 181 is identical to transfer pump 161 and is coupled to factory air source 162 through system control 200 and delivery air control valve 183. The output of pump 181 is connected to the input of the second component delivery pump 124 via conduit 186, accumulator 187, and conduit 188. The output of pump 124 is connected by conduit 189 to a second portion of heat exchanger 145 which heats the second component to a desired temperature. Conduit 192 connects the second component output of heat exchanger 145 to dispensing device 116. Second component delivery system 120 further includes return conduit 142 for returning the second component from the dispensing device 116 to second source 114. A second switching ball valve 142*a*, which may be carried by dispenser 116, can close return conduit 142 and direct the entire output of pump 124 to the dispenser 116.

The first and second transfer pumps 131 and 181 can comprise Model 900 Transfer Pumps marketed by Glas-Craft, Inc., heaters 128 and 130 can be any commercially available, thermostatically controlled band heaters and heat exchanger 145 can comprise any commercially available thermostatically controlled heat exchanger.

Component delivery systems 118 and 120 are separate from one another. The first and second components circulate through their respective delivery systems and do not come into contact with one another except in the mixing and dispensing device 116 during dispensing. As indicated above, while the system 100 illustrated by FIG. 1 includes means to effect recirculation and heating of the first and second components, such as component source pumps and controls (131, 133, 181, 183) accumulators (135, 187) heating means (128, 130, 145) and component return conduits (141, 142), other systems of the invention do not require such components, and the first and second component pumps 122 and 124 can be connected to and deliver the first and second component directly from their sources to the mixing and dispensing device 116.

Mixing and dispensing device 116 can comprise either a pouring dispenser or a spraying dispenser. The first and second components are mixed in dispenser 116, and the mixture is dispensed through an outlet orifice in the dispenser. In the system example described in detail below, dispenser 116 carries controls to operate the system once the system is set up. For example, a dispenser actuator can simultaneously operate a valve means 20 mounted on or in the dispenser to permit the first and second components in component delivery systems 118 and 120, respectively, to flow into a mixing chamber within the spray gun and provide a signal through conduit 143 to control the operation of the first and second component pumps, 122, 124. If desired, a chopper (not shown) can be mounted to the dispenser 116 to dispense reinforcing glass fibers to be incorporated into the dispensed plural component material. In response to the signal through conduit 143, dispenser 116 may also be provided with a flow of compressed air through conduit 144 from system control 200 to operate an air-driven actuator for valve means 20 and a flow of compressed air at a regulated pressure from control system 200 through conduit 148 for use in atomizing the mixed plural component material for deposition on a substrate 147. In multi-component applications that use pouring dispensers, for example, where the polyol and isocyanate components are mixed and poured into spaces formed in articles of manufacture, such as refrigerators, to provide thermal insulation within the article, no atomizing air is required. The dispenser actuator can be a push bottom, lever, trigger or other such actuator.

As shown in FIG. 2, substantially the entire system illustrated in FIG. 1, except for sources 112 and 114 and accumulators 135 and 187, can be supported on a wheeled base 196 so that it may be easily moved from location to location for use. A mast and boom assembly 197, including a mast 198 and a boom 199, extends upwardly and outwardly from the base 196 and supports the various conduits for the first and second components 141, 142, 146, 192 leading to and from the dispenser 116 and the several air lines 143, 144, 148 leading to the dispenser 116. At least the boom 199 is preferably constructed to have a variable extent, for example, hinged and folding, so that it may be extended outwardly to the desired length for most convenient use.

The various fluid and air conduits in the system are preferably constructed of materials that are chemically inert to the fluid component materials and that are flexible in nature so as to permit unencumbered movement of the dispenser 116 mounted to the ends of the various conduits during use. The fluid conduits 141, 142, 146, 192 are preferably nylon or include a nylon inner tubing, but the air conduits 143, 144, 148 may be polyethylene. Substantial portions of the conduits may also be enclosed Within a flexible sleeve 195 to protect the conduits and to prevent them from becoming entangled in one another.

FIG. 3 illustrates pumping assembly 140 of the system of FIGS. 1 and 2. As previously described, pumping system 140 includes a first positive displacement pump 122 for pumping the first component in the first delivery system 118 and a second positive displacement pump 124 for pumping the second component in the second delivery system 120.

The fluid component pumps 122 and 124 preferably comprise positive displacement piston pumps simultaneously operated by a common air motor drive means 125. Specifically, air motor drive means 125 comprises a single, reciprocating, air-driven, variable ratio (1:1–2.5:1) piston motor 126 connected to piston pumps 122 and 124 by a common linkage mechanism 154. Linkage mechanism 154 includes first and second linkage members 158 and 159 connecting the piston motor 151 to the pistons of the first and second delivery pumps 122 and 124, respectively. Specifically, the inner ends **158*a* and 159*a* of first and second linkage members 158 and 159 are pivotally connected to opposite ends of a central coupling member 156, which is rigidly mounted to the end of piston motor drive rod 157 by rotatable couplings 161 and 162, respectively. The outer ends 158*b* and 159*b* of linkage members 158 and 159 are pivotally mounted to connector members 166 and 167 by rotatable couplings 163 and 164, respectively. Connector members 166 and 167 are, in turn, connected to a rigid frame generally designated by reference numeral 165. Thus, as drive rod 157 reciprocates up and down during the operation of drive motor 126, linkage member 158 will be caused to pivot around rotatable coupling 163 first in a counterclockwise direction, as shown in FIG. 3, (upwardly) and then in a clockwise direction (downwardly); and linkage member 159 will be caused to pivot around coupling 164 first in a clockwise direction, as shown in FIG. 3** (upwardly) and then in a counterclockwise direction (downwardly).

Piston rods 152 and 153 of pumps 122 and 124 are pivotally connected to linkage members 158 and 159, respectively, at positions intermediate the ends thereof by coupling members 176 and 177. Therefore, as the linkage members 158 and 159 pivot back and forth around rotatable couplings 163 and 164, respectively, piston rods 152 and 153 will be simultaneously reciprocated up and down to operate the piston rods 152 and 153 of pumps 122 and 124. The pump cylinders 170 and 171 within which the piston rods 152 and 153 reciprocate are also pivotally mounted to frame 165 by rotatable couplings 172 and 173 which free the cylinders 170, 171 to rotate as the linkage members 158, 159 pivot around their respective pivots 163, 164.

To permit variation of the ratios of the first and second components of the plural component material, the positions of the first and second component pumps 122 and 124 can be independently adjusted in the pumping assembly 140 to permit separate adjustment of the stroke length of each of the pistons 152, 153 in the pumps 122, 124. As shown in FIG. 3, the positions of coupling members 176 and 177 can be changed along the lengths of first and second linkage members 158 and 159 to engage any one of a plurality of holes in each of the linkage members 158 and 159 that extend from adjacent their outer mounted ends **158*b*, 159*b* to adjacent their inner driven ends 158*a*, 159*a*. Changing the engagement of the coupling members 176 and 177 with the holes along the lengths of linkage members 158 and 159 can increase or decrease the relative volumes of first and second components delivered with each stroke of the air motor 125. By moving coupling members 176 and 177 closer to the inner driven ends 158*a* and/or 159*a* of the linkage members 158, 159, the stroke length of the piston rods 152 and 153 of pumps 22 and 24 is increased as the linkage members 158, 159 are driven up and down by piston 157 and linkage 156 during operation of air motor 125. To reduce the stroke length of one or both of the pumps, the positions of coupling members 176 and/or 177 are moved toward the outer mounted ends 158***b* and/or 159*b* of the linkage members 158 and 159. In like manner, the location of the ends of cylinders 170 and 171 can be changed to one of a plurality of holes extending from the inner ends 168*a* and 169*a* of base members 168 and 169 to their outer ends 168*b* and 169*b*.

The pump assembly 140 can provide variation in the ratio of the flow rate of the first component compared to the flow rate of the second component from about 16 to 1 to about 1 to 16. The pumping system 140 includes a single, low-cost, air-driven, piston motor 126, drives the two positive displacement piston pumps 122 and 124 while permitting independent adjustment of the displacement of pumps 122 and 124 to independently control the rate of fluid component flow through delivery systems 118 and 120 to the dispenser FIG. 4 is a schematic block diagram of a control 200 for systems of the invention. As shown in FIG. 4, control 200 is connected with source of compressed air 132, which is shown as factory air. Such factory air is typically compressed air having a pressure of, for example, 80 to 100 psi. System control 200 controls the flow of compressed air from the factory air source 132 to operate the air motor 151 of drive pump means 125, and to operate the dispenser 116.

An important feature of the invention is the manner in which the fluid delivery system 110 operates to maintain substantially constant preselected rates of flow of the multiple components of the plural component materials including during dispensing start-up. In the invention, the system control includes a motor air control valve 202 connected between the air motor 126 of the pump drive means 125 and the source of compressed air 132. Motor air control valve 202 is adapted to assume, in a dispense mode, when the system 100 is being operated to dispense mixed plural component material, a first position to open the input 151*a* to the cylinder 151 of the air motor 126 to the source of compressed air 132 so that compressed air flowing through air conduit 123 can drive air motor piston 157 and, through the common driving mechanism 154, the first and second component pumps 122, 124 to dispense mixed first and second components from dispenser 116 at a preselected rate which is determined by the pressure applied to the cylinder 151 of the air motor 126. Motor air control valve 202 is adapted to assume, in a non-dispense mode, when the system 100 is not being operated to dispense mixed plural component material, a second position that closes the air motor input 151*a* to a flow of air both into the air motor cylinder 151 from the source of compressed air 132 and out of the air motor cylinder 151, thus maintaining the status quo and the operating pressure on the air motor and preventing the air pressure within the cylinder 151 of the air motor from rising to a higher static air pressure than the operating air pressure at which it was calibrated for the preselected rates of flow of the first and second components.

In prior systems, the input 151*a* of cylinder 151 remained open to the source of compressed air, and the air pressure within cylinder 151 would rise to a higher static pressure than the operating pressure, imposing a higher fluid pressure in the fluid conduits and passageways between the component pumps 122 and 129 and the dispenser 116, and upon commencement of dispensing operations, the first and second component pumps 122 and 124 were driven faster and the fluid pressures and rates of flow of the first and second components to and through dispenser 116 were momentarily increased. Because of the increased pressure and flow rates of the first and second components, the pump drive means 125 produced flow rates in excess of the preselected desired flow rate, and produced off-ratio mixtures of the plural component materials and mixtures of the plural component materials in component passageways of the dispenser 116 that cannot be effectively cleaned.

As shown in FIG. 4, the system control also includes an air pressure regulator 204 to adjust and control the air pressure applied to the cylinder 151 of the pump drive means 126 and an air pressure gauge 206 to indicate the air pressure output of the air pressure regulator 204.

In the system control of FIG. 4, the motor air control valve 202 of the system control is operated by a leak relay valve 210 which is connected with the source of compressed air 132 and is connected through air conduit 143 with a small air control valve carried by the dispenser 116 and actuated by a workman using the dispenser through operation of a trigger, button, level or other actuating means on the dispenser 116. For example, by actuation of a trigger on the dispenser 116 (FIG. 6), a small air valve 211 on the dispenser can be opened allowing air to escape and flow through conduit 143 and operate the leak relay valve 210, which then applies compressed air from the source of compressed air 132 to be imposed on the actuator of motor air control valve 202 through conduit 212 to open the motor air control valve to the source of compressed air 132. When the trigger of the dispenser 116 is released, the flow of air through conduit 143 is terminated by valve 211, and air pressure is removed from air conduit 212 by leak relay valve 210, and motor air control valve 202 closes the cylinder 151 of the air motor 126 of pump drive means 125 to both in-flowing and out-flowing air, and air motor piston 157 stops moving immediately and retains its stopped position, thereby immediately stopping the first and second component pumps 122, 124 and the flow of first and second components to dispenser 116 and maintaining the fluid pressure of the first and second components in the system at their status quo.

Figure 6:
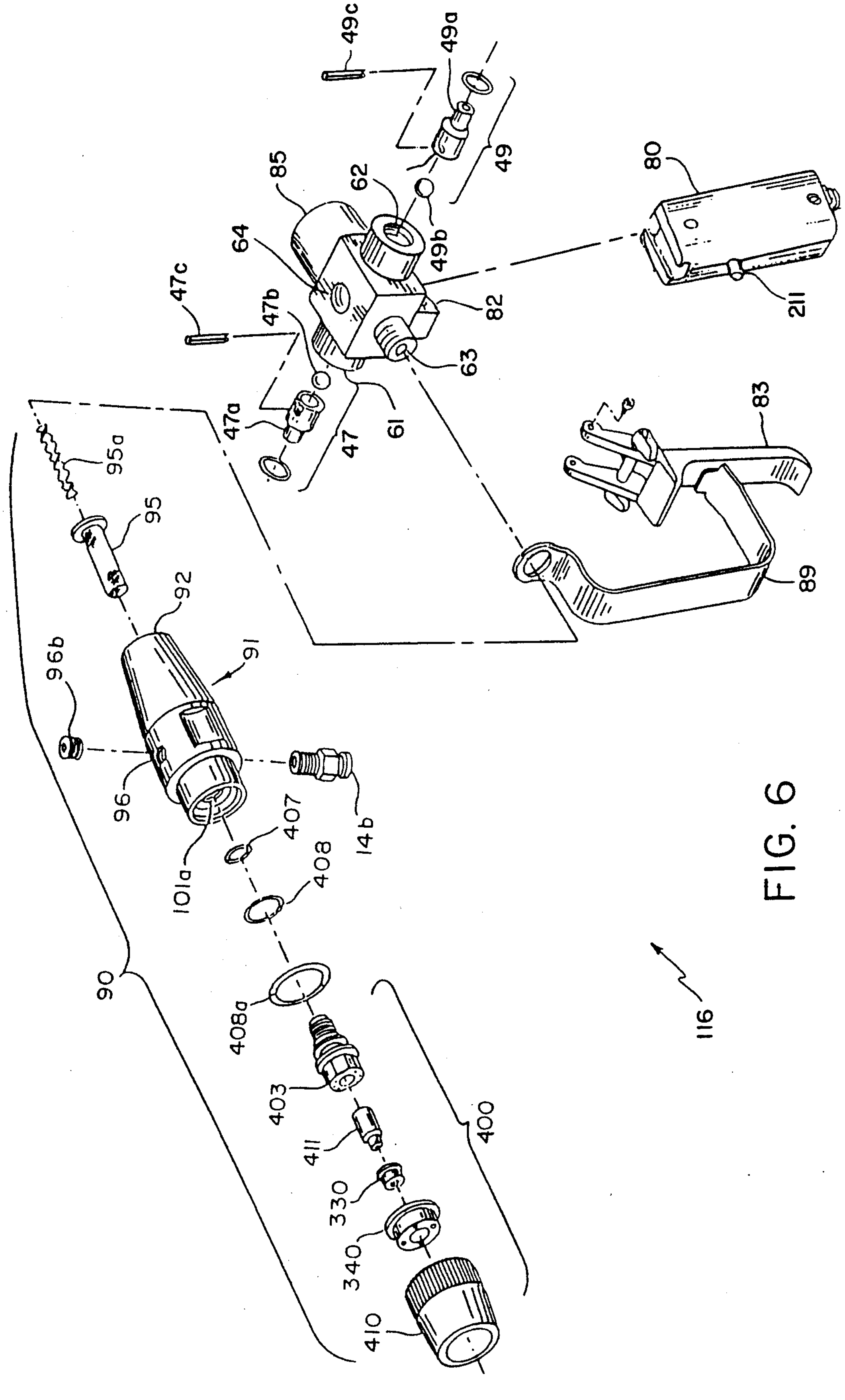
FIG. 6 is an exploded view of a fluid dispenser of the invention, including the valve of FIGS. 5A-5C and adapted for use in the multi-component dispensing system of FIGS. 1 and 2, and including means for atomizing the output of the fluid dispenser.

If desired, system control 200 can also include a fluid flow actuator valve 216 which is also operated by leak relay valve 210. Upon operation of the trigger of the dispenser 116 and leak relay valve 210 as described above, air pressure is applied by the leak relay valve through conduit 217 to operate fluid flow actuator valve 216 which, upon operation, opens air conduit 144 to the source of compressed air 132 to operate an air-operated rotating actuator (85 in FIG. 6) on the dispenser 116 that operates the fluid flow control valve 20.

Where the dispenser 116 is in a spray gun, as shown in FIG. 6, the system control 200 can also include an air pressure regulator 220 to adjust and control the flow of compressed air which is directed through air conduit 148 to the dispenser 116 for atomization of the mixed plural component material flowing from the output 116*a* of the dispenser 116. The system control 200 can also include an air pressure gauge 222 to indicate the air pressure output of spraying air regulator 220.

Where the multi-component dispensing system includes recirculation of the fluid components, the system control 200 can include an on-off valve 224 which can be operated to apply air pressure through conduit 226 to the activator of motor air control valve 202 so that the air motor 126 continues to drive the first and second fluid component motors 122, 124 for recirculation.

Figure 5A:
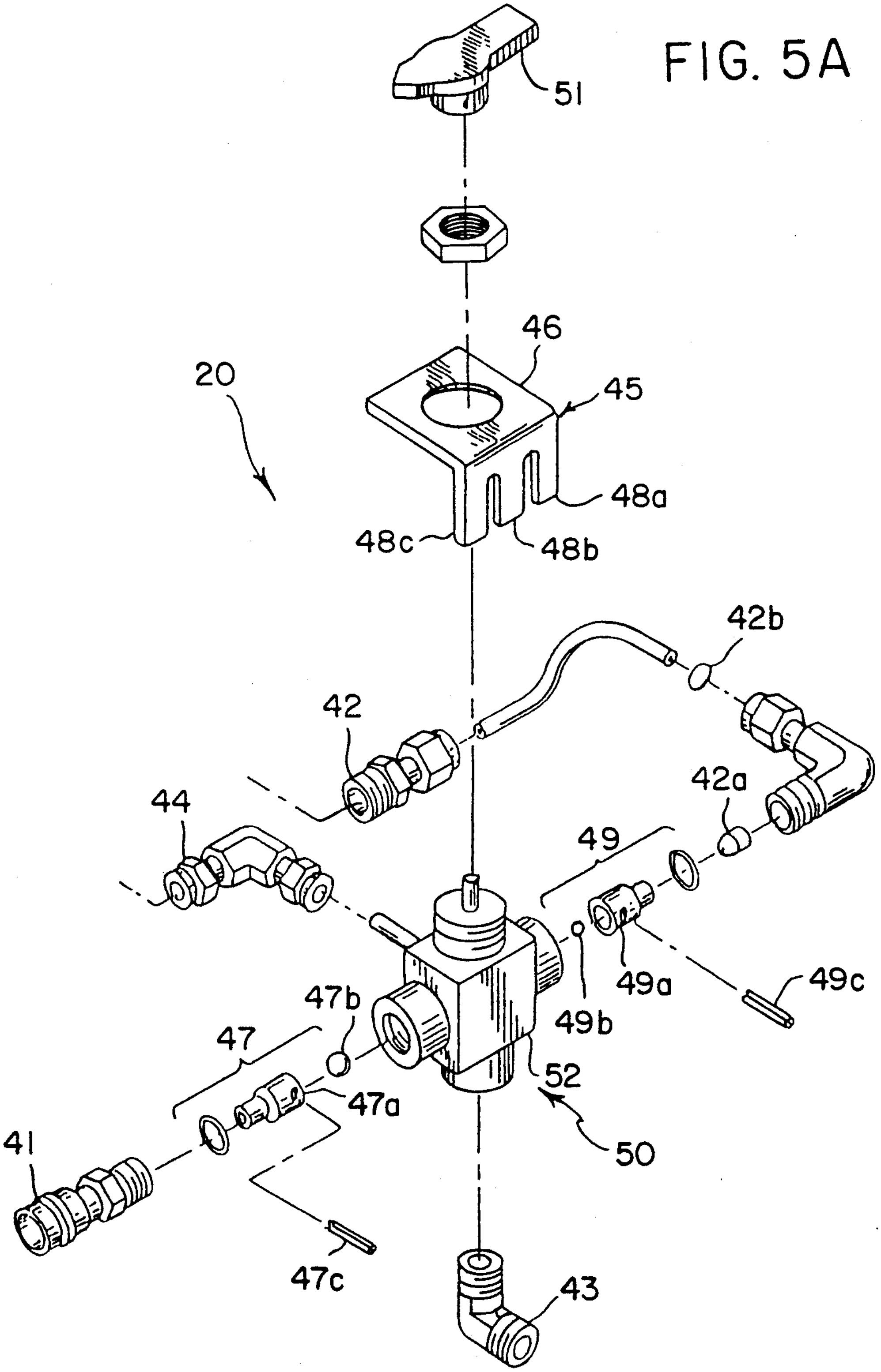
FIGS. 5A-5C are exploded and cut-away views of a valve of the invention, illustrated as a manual control valve, which is particularly preferred in multi-component dispensing systems of the invention.
Figure 5B:
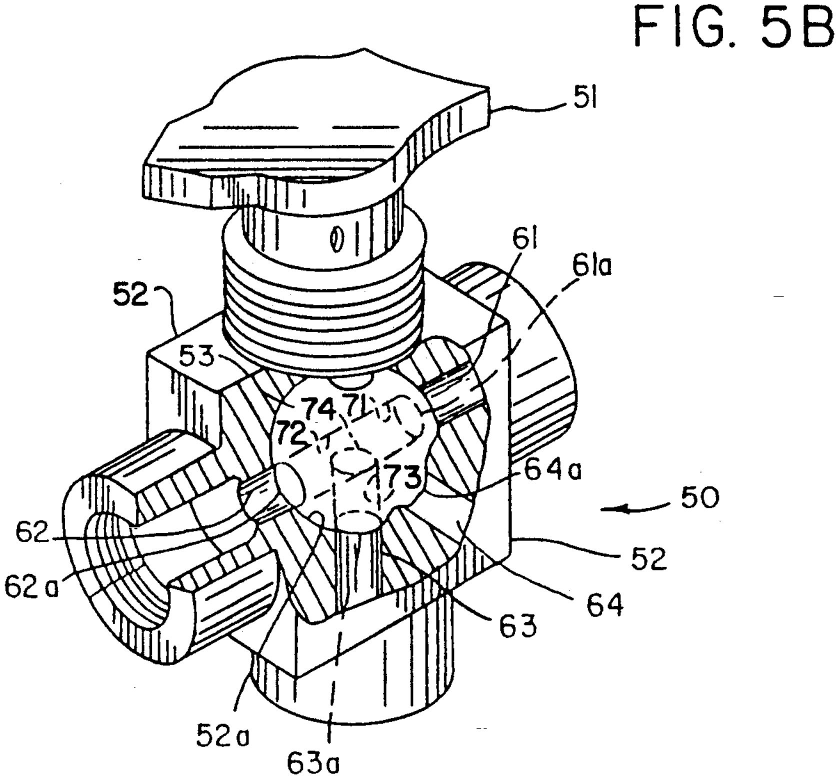
Figure 5C:
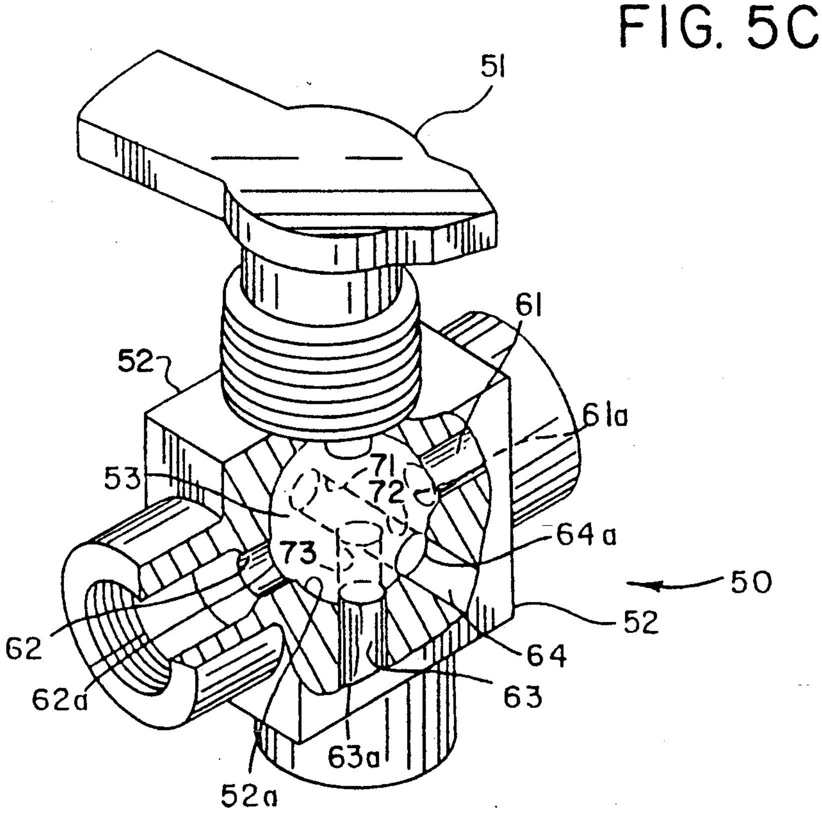

As shown in FIG. 1, multi-component dispensing systems employing internal mix dispensers may include a source of solvent 113 connected with the dispenser 116 to cleanse the dispenser 116 of mixed plural component material upon termination of operations. The source of cleansing solvent 113 may be any means for delivering solvent to the dispenser 116 and through any internal mixer and its outlet 116a, such as a pump operating from a solvent container or a pressurized solvent vessel, such as a paint pressure pot. The flow of solvent through the dispenser 116 may be effected by the workman operating a solvent flow control valve, which may be located at the source of solvent or, preferably, on the dispenser 116. In addition, the source of solvent may include a flow control valve that is automatically actuated by system control 200 at the termination of each dispensing operation to provide a flow of cleansing solvent FIGS. 5A, 5B and 5C illustrate a novel valve means 20 of the invention that is particularly advantageous when used in multi-component dispensing systems, either by itself or combined with the other novel features of the invention. As set forth below, the valve means 20 may be used alone or may be carried by or incorporated into a system dispenser. Valve means 20 is shown in greater detail in FIGS. 5A-5C and described below.

FIG. 5A is an exploded view of valve means 20 with a bracket 45 permitting the valve means 20 to be attached to and carried by another body, such as a dispenser body, a workman's body, or any other support. As shown in FIG. 5A, valve means 20 comprises a first connection 41 adapted to receive a flow of the first component of the plural component material. In the system of FIG. 1, a flow of the first component is provided from source 112 by pump 122 through conduits 136 and 146 and recirculation control valve 141a to the first connection 41. The valve means 20 further comprises a second connection 42 adapted to receive a flow of the second component of the plural component material. In the system of FIG. 1, the flow of second component is provided by pump 124 through conduits 189 and 192 and recirculation control valve 142a to the second connection 42. The valve means 20 includes a third connection 43 adapted to provide a combined output of said first and second components of the plural component material.

As further shown in FIG. 5A, valve means 20 is provided with a fourth connection 44 adapted to receive a flow of solvent. As indicated above, the flow of solvent can be provided by a pump or from a pressure pot, as known in the art.

FIG. 5A also shows check valves 47 and 49 in the connections 41 and 42, respectively, for the first and second components. Check valves 47 and 49 include body elements 47a and 49a that form internal valve seats and are adapted to be fastened in the valve means 20. Check valves 47 and 49 also include ball valves 47b and 49b that are retained in body elements 47a and 49a by roll pins 47c and 49c. In the event that one of the plural component materials would try to flow into the connection for the other plural component material, it would seat the ball valve against the valve seat formed by the body element of the check valve and flow through the check valve would be stopped. Valve means 20 can be adapted to be connected with a source of resin at connection 41 and a source of non-viscous catalyst at connection 42, and the catalyst connection 42 can be provided with a restriction 42a for the flow of non-viscous catalyst to reduce pulsation in the flow of catalyst as a result of pressure pulses due to catalyst pump operation. The restriction 42a may take many forms, but a preferable form is a conventional airless spray nozzle inserted into connection 42 as shown in FIG. 5A; an airless spray nozzle having a 0.011 inch orifice and a spray angle of 40° provides a very effective restriction. The airless spray nozzle can be protected against clogging by a screen 42b having an appropriate mesh size.

As indicated above, valve means 20 provides a valve 50 to control the flow of plural component materials for dispensing operations and the flow of solvent for cleansing operations. The valve is movable by means of actuator 51 to a first position. In the first position, first connection 41 and second connection 42 are interconnected with the third connection 43, thereby permitting the first and second components of the plural component material to flow through means 20 and the valve 50 to be combined therein and flow outwardly through the third connection 43. In the first position, the flow of solvent through the fourth connection 44 (and the valve means 20) is blocked by the valve 50. When actuator 51 places the valve 50 in the second position, the valve 50 blocks flow of plural component material through the first connection 41 and second connection 42 and connects the fourth connection 44 with the third connection 43, thereby allowing a flow of solvent through connection 44, valve 50 and third connection 43 to the dispenser, for example, dispenser 116 of FIG. 1.

As indicated above, the invention includes valve 50 and its novel structure and means of operation. FIGS. 5B and 5C illustrate the valve 50 of this invention in greater detail. As shown in FIGS. 5B and 5C, valve means 20 can be formed by a valve body 52 and a movable valve member 53 carried within a cavity formed by surface 52a of the valve body. The movable valve member is preferably a spherical valve member that is rotatable between the first and second positions thus providing the inexpensive, reliable ball valve structure. Although not shown in the drawings, the preferred ball valve structure of this invention is provided with seals for its operation in a manner well known to those skilled in the valve art. U.S. Pat. Nos. 3,675,895; 3,735,956; 4,026,516; and 4,685,488 disclose structures for sealing such valves.

As shown in FIGS. 5B and 5C, the valve body 52 is provided with a first passageway 61 which can lead from a first connection for fluid material, such as the first connection 41 shown in FIG. 5A. First passageway 61 leads to a first interior opening 61a at the cavity 52a of the valve body. The valve body is further provided with a second passageway 62 leading from a second connection which can be, for example, second connection 42 as shown in FIG. 5A, to a second opening 62a at the cavity 52a of the valve body. The valve body can further be provided with a third passageway 63 leading from a third connection, such as connection 43 of FIG. 5A, to a third opening 63a at the cavity 52a of the valve body. The valve body 52 can be provided with a fourth passageway 64 leading from a fourth connection which can be, for example, connection 44 of FIG. 5A, to a fourth opening 64a at the cavity 52a of the valve body.

The movable valve member, or ball, 53 is provided with a first valve passageway 71, a second valve passageway 72 and a third valve passageway 73, all leading to an internal passageway junction 74. The valve body passageways 61, 62, 63 and 64 and the movable valve member passageways 71, 72 and 73 are located at the cavity-forming surface 52*a* of the valve body and the surface of the movable valve member 53 so that in the first position of the movable valve member, shown in FIG. 5B, first valve passageway 71 is aligned with the first passageway 61 of the valve body, the second valve passageway 72 is aligned with the second passageway 62 of the valve body and the third valve passageway 73 is aligned with the third passageway 63 of the valve body thereby permitting fluid materials, such as first and second components of the plural component material, to flow through the first and second passageways 61, 71, 62 and 72 of the valve body and valve member, respectively, to combine at the internal passageway junction 74 and to flow through the third passageways 73 and 63 to a third, or output, connection. In the second position of the valve member 53, shown in FIG. 5C, either one of the first member 53 can be aligned with the fourth passageway 64 of the valve body and the other of the first and second valve passageways 71, 72 is blocked by the cavity wall 52*a* of the valve body 52. As shown in FIG. 5C, the second valve passageway 72 is aligned with the fourth passageway 64 of the valve body and the first valve passageway 71 of the movable valve member 53 is blocked by wall 52*a* of the valve body 52. In the second position, the third valve passageway 73 is aligned with the third passageway 63 of the valve body, thereby permitting fluid, such as solvent, to flow through the fourth passageway 64 of the valve body, passageway 72 of the movable valve member 63 to the internal passageway junction 74, into passageway 71 and outwardly through the third valve passageway 73 and third passageway 63 of the valve body to the third, or output, connection. It is apparent by rotation of the valve body 53 through 90° clockwise and counterclockwise, passageways 71 or 72 of the movable valve member may be aligned successively with the fourth passageway 64 of the valve body with the other passageway being blocked.

As shown in FIGS. 5B and 5C, the movable valve member 53 is preferably rotatable about the central axis of the third valve passageway 73 so the third valve passageway 73 remains in alignment with the third passageway 63 of the valve body 52. As is also shown in FIG. 5B and 5C, the first and second valve passageways 71 and 72 of the movable valve member 53 preferably share the same central passageway axis and form a "T" with the third valve passageway 73 at the internal junction 74 of the movable valve member.

Where the valve 50 is used in multi-component dispensing systems, it is preferable that passageways 61 and 62 be used for the components of the plural component material. Passageways 61 and 62 of the valve body 52 can include check valves, such as check valves 47 and 49 shown in FIG. 5A, to block flow of fluid materials from junction 74 outwardly through passageways 61 and 62. As shown in FIG. 5A, such a check valve arrangement will prevent a curing agent of one plural component material from being forced outwardly from junction 74 into the connections to valve means 20. Where size permits, check valves may be provided at the entrance of passageways 71 and 72 of the movable valve member. It will be apparent that by rotating actuator 51 through 90° from the first position, the internal passageways of valve 50 that contain combined components of the plural component material can be cleansed of the residue of any such components by a flow of solvent through the fourth passageway 64 and passageways 71, 72, 73 and 63 of the valve 50.

The valve 50 is particularly adaptable to be carried by a dispenser body, such as the body of a spray gun, for example at the base of the handle. In such an adaptation, the valve body 52 is provided with a connector surrounding the third passageway 63 and the connector at third passageway 63 is attached to the base of the handle of a spray gun. In such a position, the actuator 51*a* of the valve 50 can be easily operated by the workman to switch the operation of a spray gun from a spraying to a cleaning mode.

Where the plural component supply means 20 is carried by the body of the workman or where the valve 50 is carried at the base of the handle of a spray gun, it is preferable that the connections for the plural component materials and solvent provide closely spaced hose connections that extend in a convenient direction. For example, as shown in FIG. 5A, the first and second connections 42 and the fourth connection 44 can be grouped closely together and extend in such a direction that the hoses extending therefrom for the plural component materials and solvent, respectively, extend in a convenient direction. Where the valve body 50 is attached at the base of a handle of a spray gun, a rotatable connection can be interposed between the passageway 63 of the valve body and the internal passageway of the spray gun. It is not necessary that the valve 52 be attached at the base of the handle of the spray gun, it may, of course, be attached at the forward portion of a spray gun if the fluid passage of the spray gun is restricted to the forward portion thereof, or, as described below and shown in FIG. 6, the valve 50 may be built in to the body of a dispenser.

It is apparent that the invention provides an improved plural component dispensing method applicable to many plural component dispensing operations and also provides a substantially improved apparatus and method for spraying plural component materials. The plural component dispensing method of the invention includes the steps of providing connections for plural component materials and supporting and carrying the connections on a body, providing a flow of a first component of a plural component material at a first one of the connections and a second flow of plural component material at a second one of the connections, combining the flows of first and second components of plural component material at the location of the connections supported and carried by the body and providing a combined flow of the first and second components from a third one of the connections to and through a dispenser. In the method, the combined flow of the first and second components can be exposed to further mixing at any time after their combination.

The method of the invention permits convenient cleansing of the system of mixed plural component materials by providing a flow of solvent for the components of the plural component material to a fourth one of the connections supported and carried by the body and by providing a valve supported and carried by the body and operable by a workman to interconnect either the plural component connections, or the solvent connection to the dispenser for either dispensing operations or cleansing. In the method, the valve is operated by the workman to place it in the first position in which a flow of cleansing solvent is blocked and the first and second components of plural component materials are permitted to flow through the valve and the connections to be combined in the valve and directed in a combined flow through the output connection and the dispenser, and to place it in a second position in which the flows of plural component materials are blocked and the flow of solvent is permitted through the solvent connection and the valve and is directed through the output connection, and the dispenser to cleanse the system.

As shown in FIG. 6, a preferred dispenser 116 may be a gun for spraying operations that is small, lightweight, and maneuverable and adapted for substantially effortless manipulation by means of its handle 80. FIG. 6 shows such a spray gun in an exploded view. The spray gun includes a handle member 80 which is hollow and can be provided with, if advisable, a small air valve 211 connectable with a system control, such as the control 200 of FIGS. 1 and 4. The handle member 80 is attached to a main gun body 82 that includes valve 50, formed in part by the main gun body 82, and carries a trigger-like valve actuator 83 for the small air valve 211 and an air operated rotary actuator 85 for the valve 50. The main spray gun 82 forms the valve body 52, shown in FIGS. 5B and 5C, and its passageways 61, 62 and 63 and valve ball carrying surface 52*a* and carries the valve ball 53 as shown in FIGS. 5B and 5C.

Operation of the spray gun dispenser 116 will be described in conjunction with the multi-component dispensing apparatus of FIGS. 1–4.

When trigger 83 is pulled by a workman, it operates the small air flow valve 211 in the handle 80 of the gun. Small valve 211 is connected to conduit 143 at the hose of handle 80 and its operation opens leak relay valve 211 (FIG. 4), supplying operating air to the air motor 126 of plural component pump drive 125 through motor air control valve 201, and operating air to the rotary valve actuator 85 of the spray gun dispenser 116 through fluid flow actuator valve 216, all as described above. The rotary valve actuator 85 moves the ball valve 53 within the spray gun body 82 to its first position, shown in FIG. 5B, permitting the first and second components that are now being pumped from the first and second component pumps 122, 124 to flow into passageways 61 and 62 of the spray gun body 82 and to be mixed within the spray gun body 82 and expelled through its outlet passageway 63. As described below, with the dispenser of FIG. 6, the mixed plural component material is atomized by nozzle means 400 attached at the front of the spray gun body 82.

When the trigger 83 is released by the workman, air valve 211 again blocks the flow of compressed air through leak relay 210 and the motor air control valve 202 returns to a position where the inlet 151 of air motor 126 of the plural component pump drive is closed to air inflow and outflow and the first and second component pumps are immediately stopped and held in their stopped positions. In addition, the rotary valve actuator 85 returns the valve ball 53 within spray gun body 82 to its second position, as shown in FIG. 5B, where the outlet passageway 63 is connected with passageway 64, which may be provided with a controlled flow of solvent by any of the various methods and apparatus described above.

Figure 7:
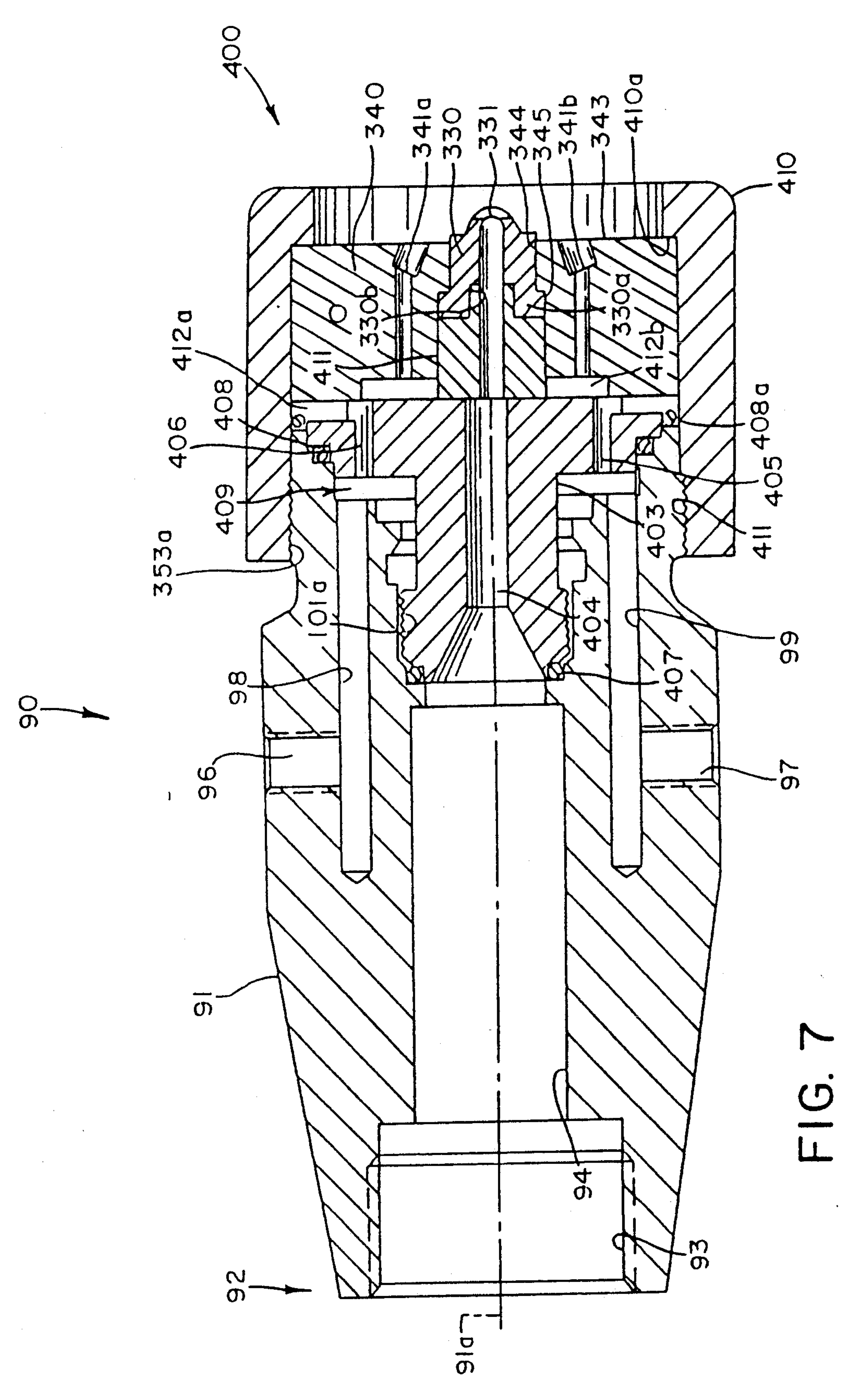
FIG. 7 is a cross-sectional view of the forward portion of the dispenser of FIG. 6 taken at a vertical plane through its center to illustrate the means for atomizing the output of the fluid dispenser.

The forward portion 90 of spray gun dispenser 116, shown in FIGS. 6 and 7, includes a body 9 adapted at its rear end 92 for threaded attachment to the threaded output of main gun body 82 and fastens trigger guard 89 to the gun body portion 82 and provides a chamber for an internal mixer 95*a*. As shown in FIG. 7, rear end 92 of the body 91 includes a threaded bore 93 adapted to be threaded onto the threaded external portion of spray gun body 82 surrounding passageway 63. The rear portion 92 of body 91 also includes an enlarged central bore 94. The enlarged bore 94 is adapted to accept a fluid material strainer 95 and a static mixer 95*a*, as shown in FIG. 6, within the body 91. Bores 93 and 94 communicate with the output passageway of the spray gun body and direct mixed plural component material forwardly to the spray forming means 400 held by threads on the forward portion of body 91. Spray forming means 400 is shown in FIG. 7 in a position to form a spray pattern with its long dimension extending vertically. Body 91 further comprises a pair of bores 96 and 97 extending transversely of the body, each intersecting one of another pair of bores 98 and 99, respectively, that extend parallel to the bore 94 and the central body axis 91*a*. Either passageway 96 or 97 can be used for the connection 14*b* and the attachment of compressed air conduit 148 to the forward portion of dispenser 116. The unused passageway, either 96 or 97, would be blocked by a threaded plug 96*b*, as shown in FIG. 6.

As shown in FIG. 7, spray forming means 400 comprises a threaded fitting 403 which is threaded into a threaded bore 101*a* formed in the forward portion of body 91. An O-ring seal 407 is compressed between threaded member 403 and the surface of the body 91 to provide a sealed engagement of bore 404 and threaded member 403 with the bores 94 and 93 of spray gun body 91. When threaded fitting 403 is threaded into body portion 91, fitting 403 compresses O-ring seals 407 and 408 against body portion 91 and forms an annular air chamber 409 between body portion 91 and fitting 403 and seals the interface between passageway 94, body portion 91 and passageway 404 of threaded fitting 403 and also seals the interface between passageways 98 and 99 of body portion 91, annular air chamber 409 and passageways 405 and 406 of threaded fitting 403.

Nozzle assembly 400 includes an airless liquid nozzle 330 and an air nozzle 340. The nozzles 330 and 340 are attached to body portion 91 with a threaded nut 410. Liquid nozzle 330 forms plural component material flowing through passageways 93, 94 and 404 into a fan-like film with expanding edges extending from the liquid nozzle 331 formed in nozzle 330. Air nozzle assembly 340 forms a controlled first flow and a controlled second flow of air through a plurality of air orifices in the nozzle assembly. Air nozzle assembly 340 includes in its preferred embodiment a plurality of air orifices 341*a*, 341*b* and a plurality of nozzles 342*a* and 342*b* (see FIGS. 8A, 8B and 9). Nozzles 342*a* and 342*b* form the compressed air flowing therefrom into an air stream having greater width than thickness. Nozzle assembly 400, including liquid nozzle 330 and air nozzle 340, forms a plural component material spray pattern which has uniform distribution of spray throughout the pattern along its longitudinal axis and without escaping spray particles. The spray pattern is substantially smaller than spray patterns obtained with prior systems and may be conveniently used by a workman operating the dispenser 116 to provide easily, a thin uniform coating on an article of manufacture. A more detailed explanation of the structure and operation of the nozzle assembly 400, that is, the manner in which threaded member 403, liquid nozzle 330 and air nozzle 340 combine in providing improved spraying operations is set forth below.

As shown in FIGS. 7, 8A and 8B, compressed air flows through annular air chambers 412*a* and 412*b* into passageways 394, 395*a* and 396*a* (see FIGS. 8B and 9) drilled into the main body of air nozzle 340. Passageways 395*a* and 396*a* intersect within the body of spray nozzle 340 with passageway 394 and are closed at the peripheral surfaces of the body. As shown in FIG. 8B, compressed air is directed via passageways 397*a* and 398*a* which intersect passageways 395*a* and 396*a*, respectively, to the plurality of air nozzles 342*a* and 342*b*. Air nozzles 342*a* and 342*b* direct an expanding air stream at the expanding, fan-like flow of mixed plural component material from the liquid nozzle 330 which is positioned in central opening 344, as described below. Central opening 344 of nozzle assembly 340 includes two flattened portions 344*a* and 344*b* (see FIG. 9) to ensure that nozzle assembly 340 is properly aligned with airless nozzle 330. Compressed air thus flows through passageways 394, 395*b* and 396*b* to passageways 397*b* and 398*b*, respectively, and to air nozzles 342*a* and 342*b* and through passageways 341*c* and 341*d*. Air nozzles 342*a* and 342*b* may be pressed into the body of nozzle assembly 340 or may be fastened therein by any convenient fastening method.

Nozzle assembly 340 surrounds airless nozzle 330, which preferably forms a fan-like film with an included angle "R" of 40°-50°; and the airless nozzle is located within opening 344 at the longitudinal center line of nozzle assembly 340. Air nozzles 342*a* and 342*b* formed by the nozzle assembly are located on a plane that is perpendicular to and bisects the expanding, fan-like liquid film formed by the airless nozzle. Air nozzles 342*a* and 342*b* are oriented to direct their expanding flow of compressed air at an acute, included angle "a" with respect to the expanding, fan-like liquid film to impinge upon the expanding fan-like film at a distance of from about five-tenths to about eight-tenths of an inch forwardly of the orifice 331 of the airless nozzle 330. Such orientation prevents a troublesome accumulation of particles on the airless nozzle. In the embodiments illustrated in FIGS. 8A, 8B and 9, air nozzles 342*a* and 342*b* can be equally spaced from the center line of the liquid orifice 331 of the airless nozzle by a distance "c" of about three-eighths of an inch to about one-half of an inch and directed to form equal acute included angles "a" of about 25° to about 35° with respect to a plane containing the expanding fan-like liquid film.

A flow of compressed air in the illustrated embodiments of FIGS. 8A, 8B and 9 is also formed by two passageways 341*c* and 341*d*, parallel to both the longitudinal axis of a nozzle assembly and to each other. Passageways 341*c* and 341*d* are equally spaced from the central axis of the airless resin nozzle a distance "e" of about three-tenths to about four-tenths of an inch and lie in the plane that perpendicularly bisects the plane through the center of the nozzles 342*a* and 342*b*. In one preferred embodiment using a resin nozzle with a nominal included angle "R" of 40°-50°, the distance "c" was about 0.458 inch; the angle "a" was about 30°; and the distance "e" was about 0.375 inch.

In addition, as shown in FIG. 8A, a pair of cavities 346*a* and 346*b* may be formed in the front face 343 of nozzle assembly 340 around air orifices 341*a* and 341*b*, respectively. Cavities 346*a* and 346*b* are formed in the front face 343 in such a manner that they extend inwardly at an acute angle with respect to air passageways 341*c* and 341*d*, respectively, but in such a manner that there are no surfaces forwardly of the air orifices 341*a* and 341*b* that lie within the imaginary extension of the air passageways 341*c* and 341*d*. Cavities 346*a* and 346*b* tend to form low-pressure areas adjacent the air orifices 341*a* and 341*b* which "soften" the edges of the compressed air jets projected from orifices 341*a* and 341*b* as the compressed air jets extend forwardly from the front face 343 of the air-catalyst nozzle. The acute angle "j" formed by the central axis of cavities 346*a* and 346*b* and the longitudinal axis of air passageways 341*c* and 341*d* may vary; with the specific embodiment described above, effective operation can be obtained with cavities 346*a* and 346*b* lying at an angle "j" equal to about 20° if the cavities have a diameter of about 0.138 inch and a depth of about 0.118 inch; and the diameter of air passageways 341*c* and 341*d* is about 0.062 inch.

In the absence of the flow of compressed air, the spray pattern of the liquid from an airless nozzle 330 includes a central portion having a high ratio of length to width and tapering ends, and two end portions at each edge of the pattern characterized by almost circular cross-sections and a heavy deposition of liquid material. The air of this embodiment directed at the fan-like resin film from air nozzles 342*a* and 342*b*, in the absence of the compressed air flows from orifices 341*a* and 341*b*, substantially widens the spray pattern, increasing the ratio of length to width of the central portion without diminishing the concentration of liquid deposition at the end portions of the pattern and, further, results in an air billowing which carries fine liquid particles away from the spray pattern into the surrounding environment. With the flow of compressed air from orifices 341*a* and 341*b* directed at the expanding edges of the fan-shaped liquid film downstream of the impingement of the air from nozzles 342*a* and 342*b*, the uncontrolled billowing of air and escaping particles is eliminated and a surprising improvement in the size and uniformity of the spray pattern results.

FIGS. 8A and 8B present an illustration of the arrangement of compressed air nozzles of air nozzle 340. The liquid nozzle forms the mixed fluid components into a fan-like film having expanded edges forming an angle "R", shown in FIG. 8A; in the preferred embodiments, "R" equals about 40° to 50°. Air passageways 341*c* and 341*d* lie preferably along axes parallel to each other and perpendicular to front face 343 of air nozzle 340. The central axes of air passageways 341*c* and 341*d* are displaced from the center line of nozzle assembly 340 and the liquid orifice 33 at such a distance that the center axes of the passageways 341*c* and 341*d* intersect the expanding edges of the liquid film that form the included angle "R" downstream of the intersection of the air spray nozzles 342*a* and 342*b*. Thus, for preferable operation, the distance "e" (the separation between the center line of air passageways 341*c* and 341*d* from the center line of liquid orifice 331) divided by the tangent of one-half of the angle "R" (the included angle formed by the expanding fan-like liquid film) is greater than the distance "c" (the separation between the center line of the air spray nozzle orifices and the center line of liquid orifice 331) divided by the tangent of "a" (the acute angle between a line parallel to the central axis of airless nozzle 330 and the center axes of air nozzles 342*a* and 342*b*). In mathematical terms:

$$\frac{e}{\tan\frac{R}{2}} > \frac{c}{\tan a}$$

In systems of the invention, the flow of compressed air is thus directed at the fan-like liquid film closely adjacent (i.e., directly at or a fraction of an inch in front of) the airless nozzle and at the expanding edges of the fan-like film downstream of the impingement of the air on the liquid film.

The air nozzle shown in FIGS. 8A, 8B and 9 can thus provide combined flows of compressed air to assist the atomization of a plural component material mixture directed from an airless atomizing nozzle and to capture the resulting spray particles in a small spray pattern for deposition on a substrate. The spraying system is thus advantageously applied not only to resin-catalyst systems for the formation of fiber reinforced plastic products such as boats, shower stalls and the like, but to plural component foam spraying systems for industrial applications.

The systems of the invention provide improved fluid dispensing systems and components, particularly for use with plural component materials. Systems of this invention are less expensive to manufacture, operate and maintain, have substantially reduced variations from desired flow rates and mixing ratios, permit reductions of compressed air pressure and more effective use of compressed air, and are more easily cleaned and manipulated than prior systems. Such systems can provide improved operation with hydraulic fluid component pressures substantially less than 500 psi and with air pressures of about 30 psi and less.

While what has been described constitutes but one of many embodiments, the invention can take many other forms. The described system includes apparatus to effect recirculation and heating of the fluid components which are unnecessary to the invention. In addition to the described systems, the invention includes novel valve and dispenser means for multi-component dispensing system. Accordingly, it should be understood that the invention is to be limited only insofar as is required by the scope of the following claims.

What is claimed is:

1. An internal mix dispenser for plural component materials, comprising:

a dispenser body carrying a dispensing outlet for said plural component materials, said dispenser body also carrying a first component connection to receive a flow of a first component, a second component connection to receive a flow of a second component, a solvent connection to receive a flow of solvent and a flow control valve between said first component, second component and solvent connections and said dispensing outlet for controlling the flow of said first and second components and said solvent to said dispensing outlet, said flow control valve comprising:

a valve body forming a cavity;

a movable valve member carried within said cavity of said valve body and movable between first and second positions, said valve body having a first passageway between said first component connection and a first internal opening at the cavity of the valve body, a second passageway between said second component connection and a second internal opening at the cavity of the valve body, a third passageway between said dispensing outlet and a third internal opening at the cavity of the valve body and a fourth passageway between said solvent connection and a fourth internal opening at the cavity of the valve body;

said movable valve member being provided with a first valve passageway leading from a surface of the movable valve body to an internal passageway junction, a second valve passageway leading from a surface of the movable valve body to said internal passageway junction and a third valve passageway leading from a surface of the movable valve body to said internal passageway junction;

said internal openings of said valve body and said movable valve member passageways being located at the cavity of the valve body and the surface of the movable valve member so that:

in said first position of the movable valve member, said first valve passageway is aligned with said first passageway of said valve body, said second valve passageway is aligned with said second passageway of said valve body and said third valve passageway is aligned with said third passageway of said valve body, thereby permitting said first and second components to flow through the first and second passageways of the valve body and said movable valve member, to combine at the internal passageway junction of the movable valve member and to flow through the third passageways of the movable valve member and valve body to said dispensing outlet; and so that in said second position, one of said first and second valve passageways is aligned with said fourth passageway of said valve body, the other of said first and second valve passageways being blocked by the valve body, and said third passageway of said valve body is aligned with said third valve passageway, thereby permitting solvent to flow through said fourth passageway of the valve body and said one of the first and second valve passageways to said internal passageway junction and to flow through the third passageways of the valve member and valve body to said dispensing outlet.

2. The internal mix dispenser of claim 1 wherein said dispenser body forms said first component connection, said second component connection, said solvent connection and said valve body and cavity.

3. The internal mix dispenser of claim 1 wherein a spraying means is connected with said dispensing outlet.

4. The internal mix dispenser of claim 3 further comprising a handle on said dispenser body.

5. The internal mix dispenser of claim 3 wherein said spraying means includes mixing means between said valve and said outlet.

6. The internal mix dispenser of claim 1 with a system for dispensing plural component materials at a substantially constant rate, further comprising:

a first source of a first component connected with said first component connection;

a second source of a second component connected with said second component connection;

a first positive displacement pump for said first component;

a second positive displacement pump for said second component;

an air motor including a driven output and an input connected with a source of compressed air;

a driving mechanism connected between said air motor output and said first and second positive displacement pumps;

said dispenser body including a flow control actuator; and a control for said air motor comprising a motor air control valve connected between the air motor input and the source of compressed air, said motor air control valve being actuated by operation of said flow control actuator to open the air motor input to the source of compressed air, thereby driving the air motor and the first and second positive displacement pumps and dispensing first and second components from the dispensing outlet at a preselected rate, and to assume, in a non-dispense mode, a second position to close the air motor input to the source of compressed air and to maintain the operating pressure on the air motor.

7. The system of claim 6 further comprising a mixer carried by said dispenser body, and a source of solvent for mixed plural component materials connected with said solvent connection to direct a flow of solvent through said dispenser mixer and dispensing outlet for removal of mixed plural component material.

8. The system of claim 7 further comprising an air actuated solvent control valve between said source of solvent and said solvent connection, and wherein said control further comprises a timer valve to operate said air actuated solvent control valve to provide a flow of solvent to said dispenser body for a selectable time interval following each termination of fluid dispensing.

9. The system of claim 6 further comprising a source of compressed air and wherein said dispenser body is connected with said source of compressed air, said dispenser body carrying, as said dispensing outlet, an airless liquid nozzle for forming the mixed plural component material into a fan-like film with edges expanding from a liquid orifice, and an air nozzle for directing a first flow of compressed air to impinge on the fan-like film of mixed plural component material closely adjacent the liquid nozzle and for further directing a second flow of compressed air in the forward direction and substantially free of the mixed plural component material until downstream of the impingement of the first flow of compressed air, said flows of compressed air interacting with the mixed plural component material to assist the atomization of and capture of the particles of the mixture.

10. The system of claim 6 wherein said flow control actuator comprises an air signal valve, said dispenser body carries an air operated actuator for said flow control valve, and said control further comprises:

a leak relay having an input connected with said air signal valve and having outputs operating with said air operated actuator of said flow control valve and said motor air control valve.

11. The system of claim 10 wherein said system further comprises:

a first recirculation conduit connecting said dispenser body to said first source of said first component;

a second recirculation conduit connecting said dispenser body to said second source of said second component;

a first recirculation control valve carried by said dispenser body, said first recirculation control valve being actuatable to direct said first component from said first positive displacement pump selectively between said dispenser body and said first recirculation conduit;

a second recirculation control valve carried by said dispenser body, said second recirculation control valve being actuatable to direct said second component selectively between said dispenser body and said second recirculation conduit; and said control further comprises a recirculation control valve with an input connected with the source of compressed air and an output connected with a second input of the leak relay, to apply compressed air to the leak relay with the recirculation control valve in the recirculation position and through the leak relay to the motor air control valve for operation of the air motor and first and second component pumps.

12. The internal mix dispenser of claim 1 wherein said outlet includes a spraying means including an airless liquid nozzle for forming the flow of combined first component and second component into a fan-like film with edges expanding from a liquid orifice, and a nozzle assembly for directing a first flow of compressed air to impinge on the fan-like film closely adjacent to the airless liquid nozzle and assist in the formation of a particle spray and for further directing a second flow of compressed air to substantially confine the particle spray downstream of the impingement of the first flow of compressed air, said first and second flows of compressed air interacting with the fan-like film of combined first and second components to assist atomization and capture the particles of the mixture.

13. The internal mix dispenser of claim 12 wherein said first flow from said nozzle assembly comprises two flows of compressed air directed from opposite sides of fan-like film, and said second flow of compressed air comprises two flows of compressed air directed at the expanding edges of the fan-like film downstream of the impingement of the first flows to assist in the formation of and substantially confine the particle spray.

14. The internal mix dispenser of claim 13 wherein the nozzle assembly comprises:

a nozzle body having a central opening at its longitudinal center line in which the airless liquid nozzle is positioned;

a pair of air nozzles equally spaced on opposing sides of the longitudinal center line of the nozzle body for directing expanding first flows of compressed air at the planar surfaces of the fan-like film; and a pair of air orifices being equally spaced on opposing sides of the longitudinal center line of the nozzle body and located on a line that perpendicularly bisects the line between the pair of air nozzles, for directing said second flows of compressed air at the expanding edges of the fan-like film, said air nozzles being oriented to direct the first flows of compressed air to intersect the longitudinal center line of the nozzle body a fraction of an inch in front of the nozzle body, and said air orifices being positioned to direct the second flows of compressed air forwardly of the nozzle body and generally parallel to its longitudinal center line.

15. The internal mix dispenser of claim 1 wherein said movable valve member is a ball that is rotatable between said first and second positions about the central axis of the third valve passageway.

16. The internal mix dispenser of claim 15 wherein said first and second valve passageways share the same central passageway axis and form a "T" with said third valve passageway at the internal passageway junction of said ball valve member, and said dispenser body carries a rotatable actuator connected with said movable ball valve member for moving said valve member between said first and second positions.

17. A valve, comprising:

a valve body; and a movable valve member carried within a cavity of said valve body and movable between first and second positions;

said valve body having a first passageway leading from a first connection for a fluid material to a first internal opening at the cavity of the valve body, a second passageway leading from a second connection for a fluid material to a second internal opening at the cavity of the valve body, a third passageway leading from a third connection to a third internal opening at the cavity of the valve body and a fourth passageway leading from a fourth connection to a fourth internal opening at the cavity of the valve body;

said movable valve member being provided with a first valve passageway leading from the surface of the movable valve body to an internal passageway junction, a second valve passageway leading from the surface of the movable valve body to said internal passageway junction and a third valve passageway leading from the surface of the movable valve body to said internal passageway junction;

said valve body passageways and said movable valve member passageways being located at the cavity of the valve body and the surface of the movable valve member so that:

in said first position of the valve member, said first valve passageway is aligned with said first passageway of said valve body, said second valve passageway is aligned with said second passageway of said valve body and said third valve passageway is aligned with said third passageway of said valve body, thereby permitting fluid materials to flow through the first and second passageways of the valve body and valve member, to combine at the internal passageway junction of the valve member and to flow through the third passageways of the valve member and valve body to said third connection; and so that in said second position, one of said first and second valve passageways is aligned with said fourth passageway of said valve body, the other of said first and second valve passageways being blocked by the valve body, and said third passageway of said valve body is aligned with said third valve passageway, thereby permitting fluid to flow through said fourth passageway of the valve body and said one of the first and second valve passageways to said internal passageway junction and to flow through the third passageway of the valve member and valve body to said third connection.

18. The valve of claim 17 wherein said movable valve member is a ball that is rotatable between said first and second positions.

19. The valve of claim 18 wherein said ball valve member is rotatable about the central axis of the third valve passageway.

20. The valve of claim 19 wherein said first and second valve passageways share the same central passageway axis and form a "T" with said third valve passageway at the internal passageway junction of said ball valve member.

21. The valve of claim 17 wherein said valve body is adapted to be carried by a spray gun body with said third connection in communication with a fluid passageway of said spray gun, and wherein a small actuator is connected to the movable valve member and extends through the valve body adjacent the spray gun body.

22. The valve of claim 17 wherein the valve body is adapted at said first, second and fourth connections to provide closely spaced hose connections that extend in a convenient direction.

* * * * *

UNITED STATES PATENT AND TRADEMARK OFFICE

CERTIFICATE OF CORRECTION

PATENT NO. : 5,294,052

DATED : March 15, 1994

INVENTOR(S) : Timothy S. Kukesh

It is certified that error appears in the above-indentified patent and that said Letters Patent is hereby corrected as shown below:

In Col. 23, line 10, before "open", insert --assume, in a dispense mode, a first position to--.

Signed and Sealed this

First Day of October, 1996

Attest:

BRUCE LEHMAN

*Attesting Officer*

*Commissioner of Patents and Trademarks*